//(12) United States Patent
Morris

(10) Patent No.: US 8,129,009 B2
(45) Date of Patent: Mar. 6, 2012

(54) COMPOSITION COMPRISING ETHYLENE COPOLYMER

(75) Inventor: Barry Alan Morris, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 1412 days.

(21) Appl. No.: 11/098,228

(22) Filed: Apr. 4, 2005

(65) Prior Publication Data

US 2005/0227030 A1    Oct. 13, 2005

Related U.S. Application Data

(60) Provisional application No. 60/561,636, filed on Apr. 13, 2004.

(51) Int. Cl.
    B32B 27/32    (2006.01)
(52) U.S. Cl. .................. 428/35.9; 428/34.2; 428/36.6
(58) Field of Classification Search .............. 428/36, 428/34.9, 461, 476.1, 516, 215, 1.54, 1.6, 428/36.9, 35.7; 426/398; 524/417
    See application file for complete search history.

(56) References Cited

U.S. PATENT DOCUMENTS

| | | | |
|---|---|---|---|
| 4,387,126 A | 6/1983 | Rebholz | |
| 5,057,372 A | 10/1991 | Imfeld et al. | |
| 5,227,245 A | 7/1993 | Brands et al. | |
| 5,582,923 A | 12/1996 | Kale et al. | |
| 5,773,155 A | 6/1998 | Kale et al. | |
| 6,503,637 B1 * | 1/2003 | Van Loon | 428/516 |
| 6,521,306 B1 | 2/2003 | Hoenig et al. | |
| 2002/0081358 A1 * | 6/2002 | Galland et al. | 426/398 |

FOREIGN PATENT DOCUMENTS

| | | |
|---|---|---|
| CN | 1 424 780 A | 6/2003 |
| JP | 59 115843 A | 7/1984 |
| WO | WO 03/051630 A | 6/2003 |

OTHER PUBLICATIONS

Dan Fella et al, Adhesion Properties and Performance of Ethylene-Ethylacrylate, TAPPI, Rome, May 2003.
Brian Walther et al, Adhesion Properties and Performance of Ethylene-Ethylacrylate Copolymers, TAPPI, Rome, May 2003.
Bernard Henn, It's Time to Get to Know n-Butyl Acrylate Copolymers, Plastic Technology pp. 71-74 (Jun. 1992).
Donna S. Davis et al, High Frequency Sealing of Polyolefin Structures, J. Plastic Film & Sheeting, vol. 11, 113-125, (Apr. 1995).
Donna S. Davis, ENBA: Expanding the Portfolio. Antec '95 pp. 2115-2119.
Erkki Laiho et al, Specialties for Extrusion Coating—High Pressure Copolymers, 1995 Polymers, Laminations & Coating Conference, pp. 613-623.
T. Hjertberg et al, The Effect of Corona Discharge Treatment of Ethylene Copolymers on Their Adhesion to Aluminum, J. Appl. Polymer Science, vol. 37, 1183-1195 (1989).
PCT International Search Report International application No. PCT/US2005/012459, dated Aug. 16, 2005.

* cited by examiner

*Primary Examiner* — Rena Dye
*Assistant Examiner* — Ellen S Wood
(74) *Attorney, Agent, or Firm* — Lucas K. Shay

(57) ABSTRACT

Disclosed are lamination processes using an ethylene copolymer to provide improved adhesion of foil to thermoplastic compositions (for example, polyester or polyolefins such as polyethylene and polypropylene). Also disclosed are multilayer structures comprising foil laminated to thermoplastic compositions using ethylene copolymer composition as a tie layer. These multilayer structures are useful as packaging films and industrial films. Also disclosed are packages that comprise these multilayer structures.

8 Claims, No Drawings

COMPOSITION COMPRISING ETHYLENE COPOLYMER

This application claims the benefits of U.S. Provisional Application 60/561,636, filed Apr. 13, 2004, the entire disclosure of which is incorporated herein by reference.

The invention relates to a multilayer structure comprising thermoplastic composition comprising an ethylene copolymer, to package comprising the multilayer structure, and to lamination processes using an ethylene copolymer to provide adhesion of foil to the thermoplastic composition.

BACKGROUND OF THE INVENTION

Aluminum foil (Al) is used extensively in the food packaging industry as a moisture and gas barrier. Because of foil's poor flex crack resistance, inability to form a hermetic seal and cost, it is typically combined with other materials such as paper, polyethylene (PE), oriented polypropylene (OPP) and polyesters such as polyethylene terephthalate (PET) in multilayer structures. Thus, multilayer structures comprising foil layers adhered to thermoplastic compositions are well known in the art of packaging films. Applications include many dry food packages such as powdered drink mix pouches as well as non-packaging applications. Some common structures include: Paper/LDPE/Al/LDPE; OPP/primer/LDPE/Al/LDPE; PET/primer/LDPE/Al/LDPE; and PET/print/primer/LDPE/Al/LDPE.

Among other functions, the paper, OPP or PET provide stiffness and a surface for printing. The primer allows low-density polyethylene (LDPE) to bond to the OPP or PET substrate; the internal LDPE layer provides adhesion to the aluminum foil and the external LDPE layer acts as a sealing layer.

These structures can be made by extrusion coating or lamination, which involves laying down a molten curtain of the polymer between the substrates moving at high speeds as they come into contact with a cold roll. Adhesion of polyethylene to foil can be accomplished by processing at high coating temperatures (300 to 330° C.) so that a portion of the polyethylene oxidizes. Oxidization of the LDPE creates polar species that provide moderate adhesion to the aluminum foil.

In many applications, rather than using a coated layer of LDPE as the sealant, a LDPE or LLDPE film is used. For example: Paper/LDPE/Al/LDPE/PE-film. The PE-film may be LDPE or LLDPE.

A problem with using LDPE to extrusion laminate PE-films to aluminum foil is that the adhesion of the LDPE to aluminum foil "ages down" with time. Adhesion of LDPE to aluminum foil is only marginally adequate to begin with, but over a time period of one to several weeks, the bond strength often declines to a level that is no longer functional for the application. One explanation is that the aging is associated with secondary crystallinity of the LDPE. During the lamination process, the LDPE is quenched very quickly and little primary crystallization can occur. Over time, small "secondary" crystals may form. As PE crystallizes, it shrinks. Shrinkage can put a stress on bonds and reduce peel strength. The LDPE-Al bond is the weakest of the bonds in the structure (bonds of the LDPE to the PE-film are typically inseparable).

In adhering foil to non-polar polymer compositions such as polyethylene, use of an additional polymeric composition as an adhesive or "tie" layer can be beneficial. However, polar polymers that adhere well to foil may not adhere well to non-polar polymers. Therefore, a tie layer must provide a balance of properties that allow it to adhere both to foil and to non-polar polymers.

Chemical primers are sometimes used to promote adhesion to thermoplastic substrates, but this adds costs and causes environmental concerns with solvent-based systems. Thus, it is desirable to develop a composition that adheres substrates like PET without the use of primers. An example is disclosed in U.S. Patent Application 2004/0001960.

SUMMARY OF THE INVENTION

The invention includes a multilayer structure comprising or produced from a first layer, a second layer, a third layer, and optionally a fourth layer wherein the first layer comprises at least layer of foil; the second layer comprises at least one layer of an ethylene copolymer; the third layer comprises at least one layer of thermoplastic polyolefin or thermoplastic polyester; and the optional fourth layer comprises or is produced from a material selected from paper, polyester, polyamide, polyethylene vinyl alcohol, polyethylene vinyl acetate, ethylene/acrylic acid copolymer or ionomer thereof, polyvinylidene chloride, anhydride-modified ethylene homopolymer, anhydride-modified ethylene copolymer, or combinations of two or more thereof.

The invention also includes a lamination process comprising extruding an ethylene copolymer between a layer of foil and a layer of a thermoplastic composition.

The invention also includes a process comprising extruding an ethylene copolymer between a layer of foil and a layer of a thermoplastic polyolefin or polyester composition.

The invention further includes packages comprising or produced from the multilayer structure.

DETAILED DESCRIPTION OF THE INVENTION

All references disclosed herein are incorporated by reference.

Thermoplastic compositions are polymeric materials that can flow when heated under pressure. Melt index (MI) is the mass rate of flow of a polymer through a specified capillary under controlled conditions of temperature and pressure. Melt indices are determined according to ASTM 1238 at 190° C. using a 2160 g weight, with values of MI reported in g/10 minutes.

The term "foil" as used herein refers to a thin, flexible film or sheet of metal, particularly aluminum. It also refers to multilayer structures in which at least one layer of aluminum is adhered to additional layers of other materials, provided at least one face of the multilayer structure is a layer of aluminum.

The term "ethylene copolymer" includes copolymers comprising repeat units derived from ethylene and a polar comonomer such as (meth)acrylic acid, ester thereof, an alkyl acrylic acid, ester thereof, or combinations of two or more thereof. Frequently used comonomer is methyl acrylate.

The relative amount of the comonomer incorporated into an ethylene copolymer can, in principle, can be from about 0.01, about 2, or about 5 up to as high as 40 weight percent (wt %) of the total copolymer or higher. The relative amount of the comonomer present in the ethylene copolymer can establish how and to what degree the ethylene copolymer is a polar polymer composition. Preferably, the comonomer has a concentration range of from 5 to 30, from 9 to 25, or from 9 to 20 wt %.

Ethylene copolymers can be prepared by processes well known to one skilled in the art using an autoclave. See, e.g., U.S. Pat. Nos. 5,028,674 and 2,897,183. Because the process is well known to one skilled in the art, the description of which is omitted herein for the interest of brevity.

Ethylene copolymers can also be prepared using a tubular reactor, as well known to one skilled in the art. Similar ethylene copolymers can also be produced in a series of autoclave reactors wherein comonomer replacement is achieved by multiple zone introduction of reactant comonomer. See, e.g., U.S. Pat. Nos. 3,350,372; 3,756,996; and 5,532,066. The "tubular reactor produced" ethylene copolymer denotes an ethylene copolymer produced at high pressure and elevated temperature in a tubular reactor or the like, wherein the inherent consequences of dissimilar reaction kinetics for the respective ethylene and methyl acrylate comonomers is alleviated or partially compensated by the intentional introduction of the monomers along the reaction flow path within the tubular reactor. As generally recognized in the art, such a tubular reactor copolymerization technique produces a copolymer having a greater relative degree of heterogeneity along the polymer backbone (a more blocky distribution of comonomers), tends to reduce the presence of long chain branching and will produce a copolymer characterized by a higher melting point than one produced at the same comonomer ratio in a high pressure stirred autoclave reactor. Tubular reactor produced ethylene copolymers are generally stiffer and more elastic than autoclave produced ethylene/methyl acrylate copolymers.

To further illustrate and characterize the tubular reactor produced ethylene copolymer relative to conventional autoclave produced copolymer, the following list of commercially available ethylene/methyl acrylate (EMA) copolymers with associated melting point data show that tubular reactor produced EMA resins have considerably higher melting points versus autoclave EMA's due to a very different MA distribution along polymer chains:

Autoclave Produced Copolymers
 ExxonMobil, N.J.; EMA (21.5 wt % MA) mp=76° C.
 ExxonMobil, N.J.; EMA (24 wt % MA) mp=69° C.
 Atofina, France; EMA (20 wt % MA) mp=80° C.
 Atofina, France; EMA (24 wt % MA) mp=73° C.
Tubular Reactor Produced Copolymers
 DuPont EMA (25 wt % MA) mp 88° C.
 DuPont EMA (20 wt % MA) mp=95° C.

A discussion regarding the differences between tubular reactor produced and autoclave produced ethylene copolymers is shown in Richard T. Chou, Mimi Y. Keating and Lester J. Hughes, "High Flexibility EMA made from High Pressure Tubular Process", Annual Technical Conference—Society of Plastics Engineers (2002), 60th (Vol. 2), 1832-1836. Tubular reactor produced ethylene/methyl acrylate copolymers of this nature are commercially available from E.I. du Pont de Nemours and Company, Wilmington, Del. (DuPont) as shown in the following table.

| Ethylene Methyl Acrylate | CopolymerMethyl acrylate wt % | Melt Flow (g/10 min) |
|---|---|---|
| EMA-1 | 25 | 0.4 |
| EMA-2 | 25 | 0.6 |
| EMA-3 | 9 | 2 |
| EMA-4 | 14 | 2 |
| EMA-5 | 18 | 2 |
| EMA-6 | 24 | 2 |
| EMA-7 | 9 | 6 |
| EMA-8 | 20 | 8 |
| EMA-9 | 13 | 9 |

Ethylene/methyl acrylate copolymers can vary in molecular weight, as shown by the range of melt indices provided in Table A. The selection of the MI grade of polymer(s) can be by balancing the processibility of the EMA in extrusion lamination with the needs for adhesion between the foil and the thermoplastic composition. Preferred are ethylene/methyl acrylate copolymers having MI's from about 2 to about 12 g/10 min or from about 4 to about 10 g/10 min.

The EMA composition may optionally further comprise additives such as thermal and ultraviolet (UV) stabilizers, UV absorbers, antistatic agents, processing aids, fluorescent whitening agents, pigments, lubricants, etc. These conventional ingredients may be present in the compositions used in this invention in quantities that are generally from 0.01 to 20, or from 0.1 to 15, wt %.

The EMA composition may optionally further comprise from about 1 to about 40, or from 5 to 25, or from 10 to 20 wt % of at least one other thermoplastic resin. For example, when using the EMA composition to bond to a polyolefin, such as polyethylene or polypropylene, a portion of the polyolefin may be added to the EMA compositions to improve compatibility with the polyolefin substrate and/or to reduce costs. The optional incorporation of such conventional ingredients into the compositions can be carried out by any known process. This incorporation can be carried out, for example, by dry blending, by extruding a mixture of the various constituents, by the conventional masterbatch technique, or the like. The optional additional thermoplastic resin may also be incorporated as part of a recycle process.

Polyolefins suitable for use in the present invention include polypropylene or polyethylene polymers and copolymers comprising ethylene or propylene. Polyethylenes (PE) can be prepared by a variety of methods, including well-known Ziegler-Natta catalyst polymerization (see for example U.S. Pat. No. 4,076,698 and U.S. Pat. No. 3,645,992), metallocene catalyst polymerization (see for example U.S. Pat. No. 5,198,401 and U.S. Pat. No. 5,405,922) and by free radical polymerization. Polyethylene polymers useful herein can include linear polyethylenes such as high density polyethylene (HDPE), linear low density polyethylene (LLDPE), very low or ultralow density polyethylenes (VLDPE or ULDPE) and branched polyethylenes such as low density polyethylene (LDPE). The densities of polyethylenes suitable for use in the present invention can range from 0.865 g/cc to 0.970 g/cc. Linear polyethylenes for use herein can incorporate α-olefin comonomers such as butene, hexene or octene to decrease their density within the density range so described. The term "polyethylene" refers to any or all of the polymers comprising ethylene.

Polypropylene (PP) polymers include homopolymers, random copolymers, block copolymers and terpolymers of propylene. Copolymers of propylene include copolymers of propylene with other olefins such as ethylene, 1-butene, 2-butene and the various pentene isomers, etc. and preferably copolymers of propylene with ethylene. Terpolymers of propylene include copolymers of propylene with ethylene and one other olefin. Random copolymers, also known as statistical copolymers, are polymers in which the propylene and the comonomer(s) are randomly distributed throughout the polymeric chain in ratios corresponding to the feed ratio of the propylene to the comonomer(s). Block copolymers are made up of chain segments consisting of propylene homopolymer and of chain segments consisting of, for example, random copolymer of propylene and ethylene. The term "polypropylene" refers to any or all of the polymers comprising propylene.

Homopolymers and random copolymers can be manufactured by any known process. For example, polypropylene polymers can be prepared in the presence of catalyst systems of the type known as Ziegler-Natta, based on organometallic compounds and on solids containing titanium trichloride or with metallocene catalysts.

Block copolymers can be manufactured similarly, except that propylene is generally first polymerized by itself in a first stage and propylene and additional comonomers such as ethylene are then polymerized, in a second stage, in the presence of the polymer obtained during the first. Each of these stages can be carried out, for example, in suspension in a hydrocarbon diluent, in suspension in liquid propylene, or else in gaseous phase, continuously or noncontinuously, in the same reactor or in separate reactors.

Additional information relating to block copolymers and to their manufacture may be found particularly in chapters 4.4 and 4.7 of the work "Block Copolymers" edited by D.C. Allport and W. H. Janes, published by Applied Science Publishers Ltd in 1973.

Polyesters are polymers derived from the condensation of diols and diacids (or derivatives thereof such as diesters). They may be homopolymers, derived from condensation of a single type of diol and a single type of diacid. They may also be copolymers, in which additional diol, diacid or hydroxy acid components are added to provide a polyester with modified properties. Examples of polyesters include polyethylene terephthalate, polybutylene terephthalate, or both. Polyester films suitable for use in the present invention are commercially available under the tradenames Mylar® or Melinex® from DuPont Teijin Films.

The processes for preparing a multilayer structure such as extrusion coating or lamination can comprise laying down a molten curtain of the ethylene copolymer composition between the foil and thermoplastic film substrates moving at high speeds (e.g., from about 100 to 1000 or from about 300 to 800 feet per minute) as they come into contact with a cold (chill) roll. The melt curtain is formed by extruding the ethylene copolymer composition through a flat die. The temperature of the ethylene copolymer as it leaves the die is preferably between about 300 and 340° C. or between about 310 to 330° C. The air gap between the die exit and cold roll is typically about 3 to 15, or about 5 to about 10 inches. Higher temperatures generally give higher adhesion values, subject to the limitations of the thermal stability of the polymer. Lower line speeds and higher air gaps also favor adhesion. The time in the air gap (TIAG, defined as the air gap divided by the line speed) can be between about 50 and 100 meter-second for optimal adhesion in extrusion lamination. See V. Antonov and A. Soutar, 1991 TAPPI PLC Conference Proceedings, pg 553. The laminate is cooled on a cold roll and hauled off at a line speed of between about 100 and 1000, or about 300 and 800 feet/minute.

Preferred processes include:

Preferred 1. The lamination process wherein the thermoplastic composition comprises at least one polyolefin.

Preferred 2. The lamination process of Preferred 1 wherein the polyolefin is selected from the group consisting of polyethylene and polypropylene.

Preferred 3. The lamination process of Preferred 2 wherein the polyolefin is polyethylene.

Preferred 4. The lamination process of Preferred 3 wherein the ethylene/methyl acrylate copolymer composition comprises from about 1 to about 40 weight % of a polyolefin.

Preferred 5. The lamination process wherein the thermoplastic composition comprises at least one polyester.

Preferred 6. The lamination process of Preferred 5 wherein the polyester is selected from the group consisting of polyethylene terephthalate and polybutylene terephthalate.

Preferred 7. The lamination process of Preferred 6 wherein the polyester is polyethylene terephthalate.

Preferred 8. The lamination process of Preferred 7 wherein the ethylene/methyl acrylate copolymer composition comprises from about 1 to about 40 weight % of a polyolefin.

Preferred 9. The lamination process of any of the above processes wherein the ethylene/methyl acrylate copolymer is prepared in a tubular reactor.

Film substrates useful in lamination processes of this invention can be made by virtually any method for film forming known to those skilled in this art. The film can be either a single layer or multilayer polymeric film. As such, the film and film structures can be typically cast, extruded, co-extruded, laminated and the like, including orientation (either uniaxially or biaxially) by various methodologies (e.g., blown film, mechanical stretching or the like). Various additives such as antioxidants and thermal stabilizers, ultraviolet (UV) light stabilizers, pigments and dyes, fillers, delustrants, anti-slip agents, plasticizers, anti-block agents, other processing aids, and the like can be present in the respective film layers.

The manufacture of a film can be carried out according to any known methods. It is possible, for example, to manufacture a primary film by extruding the compositions using so-called "blown film" or "flat die" methods. A blown film is prepared by extruding the polymeric composition through an annular die and expanding the resulting tubular film with an air current to provide a blown film. Cast flat films are prepared by extruding the composition through a flat die. The film leaving the die is cooled by at least one roll containing internally circulating fluid (a chill roll) or by a water bath to provide a cast film. A film useful may have a width, for example, of about 60 cm (two feet), but can often be larger. Films can be slit to a desired width for further processing.

A film can be further oriented beyond the immediate quenching or casting of the film. The process comprises the steps of extruding a laminar flow of molten polymer, quenching the extrudate, reheating as necessary to reach the correct orientation temperature and orienting the quenched extrudate in at least one direction. "Quenched" denotes an extrudate that has been substantially cooled below its melting point in order to obtain a solid film material.

The film can be unoriented, oriented in a uniaxial direction (e.g. machine direction), or oriented in a biaxial direction (e.g. machine direction and transverse direction).

The film can be biaxially oriented by drawing in two mutually perpendicular directions in the plane of the film to achieve a satisfactory combination of mechanical and physical properties.

Orientation and stretching apparatus to uniaxially or biaxially stretch film are known in the art and may be adapted by those skilled in the art to produce films of the present invention. Examples of such apparatus and processes include, for example, those disclosed in U.S. Pat. Nos. 3,278,663; 3,337,665; 3,456,044; 4,590,106; 4,760,116; 4,769,421; 4,797,235 and 4,886,634.

A blown film useful in the present invention may be oriented using a double bubble extrusion process, where simultaneous biaxial orientation may be effected by extruding a primary tube which is subsequently quenched, reheated and then expanded by internal gas pressure to induce transverse orientation, and drawn by differential speed nip or conveying rollers at a rate which may induce longitudinal orientation.

The processing to obtain an oriented blown film is known in the art as a double bubble technique (e.g., U.S. Pat. No. 3,456,044). More particularly, a primary tube is melt extruded from an annular die. This extruded primary tube is cooled quickly to minimize crystallization. It is then heated to its orientation temperature (for example, by means of a water bath). In the orientation zone of the film fabrication unit a secondary tube is formed by inflation, thereby the film is radially expanded in the transverse direction and pulled or stretched in the machine direction at a temperature such that expansion occurs in both directions, preferably simultaneously; the expansion of the tubing being accompanied by a sharp, sudden reduction of thickness at the draw point. The tubular film is then again flattened through nip rolls. The film can be reinflated and passed through an annealing step (thermofixation), during which step it is heated once more to adjust the shrink properties.

In one embodiment, the film is formed by an extrusion process that causes the polymer chains in the film to be generally aligned in the direction of extrusion. Linear polymers, after being highly oriented uniaxially possess considerable strength in the orientation direction, but less strength in the transverse direction. This alignment can add strength to the film in the direction of extrusion.

A film may be treated by means of corona discharge, ozone or other means standard in the industry, although treatment is not required for good adhesion to the EMA adhesive layer. The film is laminated to a substrate such as foil using an EMA composition as an adhesive layer to provide a multilayer structure. The adhesion of the multilayer structure can be improved by increasing the thickness of the EMA layer. The thickness of the EMA layer can be between about 10 and 40 or about 15 and 30 µm thick.

The multilayer structure can be prepared by extruding the ethylene copolymer composition between the layer of foil and a layer of the thermoplastic polyolefin or polyester composition.

Preferred multilayer structures include structures prepared using the preferred processes disclosed above (Preferred 1 through 9).

As disclosed, the multilayer structure may further comprise at least one additional layer (d) comprising paper, polyester (e.g., polyethylene terephthalate), polyamide, polyethylene vinyl alcohol, polyethylene vinyl acetate, ethylene/acrylic acid copolymer or an ionomer thereof, polyvinylidene chloride, or anhydride-modified ethylene homo- and co-polymer.

These multilayer structures can be prepared as disclosed above in which a foil-containing substrate (prepared for example, by lamination or extrusion coating) is adhered to a film comprising a polyolefin or polyester using an EMA copolymer composition as an adhesive layer between the foil and the polyolefin or polyester. The foil-containing substrate may be a monolayer or multilayer structure and/or the film comprising the polyolefin or polyester may be a monolayer or multilayer structure.

Of note is a multilayer structure comprising a layer comprising oriented polyester, (particularly polyethylene terephthalate), a layer comprising an ethylene/methyl acrylate copolymer composition, and a layer comprising aluminum foil.

Also of note is a multilayer structure comprising a layer comprising foil, a layer comprising an ethylene/methyl acrylate copolymer composition, and a layer comprising polyethylene.

Also of note is a multilayer structure comprising a layer comprising foil, a layer comprising an ethylene/methyl acrylate copolymer composition, and a layer comprising polypropylene.

Also of note is a multilayer structure comprising a layer comprising foil, at least one layer comprising an ethylene/methyl acrylate copolymer composition, a layer comprising polyester and a layer comprising a polyolefin (e.g. polyethylene or polypropylene).

The multilayer structures can be useful in a variety of packaging applications as packaging materials such as packaging films. They may also be used as industrial films (for example, as a structural component in insulation sheeting).

The packaging materials may also be processed further by, for example without limitation, printing, embossing, and/or coloring to provide a packaging material to provide information to the consumer about the product therein and/or to provide a pleasing appearance of the package. In some cases, a polyester or polyolefin substrate may be reverse printed (printed on a face that will be on the interior of the multilayer structure) prior to lamination according to this invention.

The packaging materials may be formed into packages, such as pouches, by standard methods well known in the art. Typically, the multilayer structures are formed into the desired shape, for example a pouch, and then adhered, for example by heat sealing, to provide a package. Accordingly, this invention provides packages comprising multilayer structures as described above.

The following Examples are merely illustrative, and are not to be construed as limiting the scope of the invention.

EXAMPLES

General Procedures Used to Prepare the Laminates

The laminates were prepared using an extrusion laminating process. Substrate A was combined with substrate C using an adhesive layer B.

Substrate A. In Examples 1 through 8, substrate A was a laminate of oriented polyester (OPET) and aluminum foil: 13-microns thick OPET/19-microns thick ethylene/acrylic acid (E/AA) copolymer with 7 wt % acrylic acid (AA)/9-µm thick aluminum foil. The OPET was Melinex® 7100 supplied by DuPont Teijin Films. The aluminum foil has Class A wettability (i.e. water wets the surface). The (E/AA) copolymer was Nucrel® 30707, a copolymer with 7% AA manufactured by DuPont. Substrate A was prepared by extruding the E/AA copolymer using a 4.5-inch diameter, 126-inch long, single screw extruder (with an exit temperature of 321° C.) through an ER-WE-PA feedblock with a 40-inch wide (internally deckled to 29 inches) Cloeren edge bead reduction die having a 30-mil gap operated at 321° C. and backpressure 500 psig to form a 19µ thick layer laid down between the foil and OPET layers. The die plug and blade settings were 2.25 and 1.5 inches, respectively. The extrudate contacted the foil and OPET film in the nip where the assembly was subsequently squeezed together between a chill roll (operated at 10° C.) and rubber nip roll. The chill roll was in contact with the foil side of the assembly. The air gap between the die exit and the nip was 8 inches. The line speed was 500 feet per minute.

Adhesive Layer B. The resins used for the lamination adhesive layer B in the Examples are listed in Table 1, wherein MA stands for methyl acrylate and AA stands for acrylic acid. Resins b, c, d, and e are EMA resins that were used in lamination processes to prepare multilayer structures. Resin a is a polyethylene composition that can be blended with an EMA resin to form an EMA/PE composition used in accordance with this invention (or used as an adhesive composition in Comparative Examples). The other resins listed in Table 1 are used for preparation of Comparative Examples.

TABLE 1

| Resin | MI (g/10 min) | Comonomer | Wt. % | Mole % | Autoclave or Tubular* | Comment |
|---|---|---|---|---|---|---|
| a | 7 | None | 0 | 0 | A | 0.918 g/cc, LDPE |
| b | 8 | MA | 20 | 7.5 | T | EMA-8 |
| c | 9 | MA | 13 | 4.6 | T | EMA-9 |
| d | 6 | MA | 9 | 3.1 | T | EMA-7 |
| e | 6 | MA | 22 | 8.3 | A | |
| f | 7 | AA | 7 | 2.8 | A | |
| g | 11 | AA | 3 | 1.2 | A | |

*A denotes autoclave-produced and T denotes tubular reactor-produced.

Substrate C. Substrate C was a 50-μm thick polyethylene blown film made of 80% of a butene LLDPE (Sclair® 11 E1 manufactured by Nova) and 20% high pressure LDPE (Novapol® LF-0219A manufactured by Nova). The film was prepared on a Welex blown film line with an 8-inch diameter Victor die. The take-off speed was 38 feet per minute, the frost line height was 26 inches, the blow-up ratio was 2.7 and the layflat was 34 inches. Die gap was 15 thousandths of an inch. Processing temperature was 410° F.

The test laminates of structure A/B/C were prepared by extruding the adhesive polymer B using a 4.5-inch diameter, 126-inch long, single-screw extruder. The extrudate from the extruder flowed through an ER-WE-PA feedblock with a 40-inch wide (internally deckled to 29 inches) Cloeren edge bead reduction die having a 30-mil gap, blade set at 1.5 inches and plug set at 2.25 inches. The adhesive layer B was laid down between substrates A and C such that it contacted the foil layer of Substrate A. Layer C passes over the chill roll and Layer A contacts the nip roll in the nip region. Other operating conditions are described in the Examples below.

Tests Employed in Examples

Peel Strength: One-inch wide strips were cut in the machine direction from near the center of the laminate. The layers were separated at the A-B interface unless otherwise noted and pulled in a tensile tester at room temperature in a "T-peel" configuration at a separation speed of 12 inches/min. The average force required to separate the layers divided by the width as shown in Tables 2-5 is the peel strength. Typically, five separate determinations were averaged together for a given mean value (values in tables were rounded to the nearest 10, with values ending in 5 rounded up). Also shown is the standard deviation (Std). See ASTM F904. Green peel strength was measured within four hours of producing the structure. Peel strength on the same sample was typically measured again after being stored in a 50% relative humidity, 23° C. controlled environment for one, four and six weeks.

The mode of failure shown in the tables is characterized by the following descriptors:

P=peels cleanly away from the substrate;
LS=B/C film layers split;
E=elongation of the peel arm as it is pulled away from the substrate;
D=C layer peels from the B layer while B stays with layer A; and
FT=foil tear.

Example 1 and Comparative Examples C1 to C3

The laminate A/B/C was prepared using an extruder exit temperature of 610° F., air gap of 8 inches, line speed of 500 feet/minute, chill roll temperature of 50° F., lead-in of −0.6 inches, and nip pressure of 60 psig. The nip to chill roll contact across the 740 mm width was from about 13 to about 15 mm. The thickness of layer B was from about 0.6 to about 0.8 mils.

TABLE 2

| | | Peel Strength to Foil, g/in | | | | | | | | | | |
|---|---|---|---|---|---|---|---|---|---|---|---|---|
| | | Green | | | 1 week | | | 4 weeks | | | 6 weeks | | |
| Ex. | Layer B | Mean | Std | Mode | Mean | Std | Mode | Mean | Std | Mode | Mean | Std | Mode |
| 1 | b | 1340 | 90 | E/P/D | 1380 | 90 | E/P/D | 1480 | 60 | E/P/D | 1500 | 100 | E/P/D |
| C1 | a | 310 | 20 | P | 220 | 10 | P | 240 | 10 | P | 240 | 10 | P |
| C2 | f | 720 | 120 | P | 660 | 200 | P | 750 | 230 | P | 590 | 110 | P |
| C3 | g | 1070 | 380 | LS, P, D | 630 | 220 | P, P/D | 1060 | 340 | P, EP, PD | 910 | 520 | ** |

** E/LS, P, E/P

Examples 2 to 5 and Comparative Examples C4 to C5

The laminate A/B/C was prepared using an extruder exit temperature of 610° F., air gap of 8 inches, line speed of 500 feet/minute, chill roll temperature of 50° F., lead-in of −0.5 inches, and nip pressure of 60 psig. The nip to chill roll contact across the 740 mm width was from about 13 to about 15 mm. The thickness of layer B was from about 0.6 to about 0.8 mils.

TABLE 3*

| | | Peel Strength to Foil, g/inch | | | | | | | | | | |
|---|---|---|---|---|---|---|---|---|---|---|---|---|
| | | Green | | | 1 week | | | 4 weeks | | | 6 weeks | | |
| Ex | Layer B | Mean | Std | Mode | Mean | Std | Mode | Mean | Std | Mode | Mean | Std | Mode |
| 2 | b | 1210 | 80 | P, P/LS | 1480 | 40 | E/P, E/L/S | 1510 | 130 | S, P/D, P | 1420 | 90 | LS, P |
| 3 | c | 760 | 90 | P, D, LS | 730 | 120 | P/D, LS | 830 | 140 | P/D, LS | 1160 | 220 | D, E/P |
| 4 | d | 530 | 50 | P | 510 | 40 | P | 510 | 40 | P | 690 | 200 | P |
| 5 | e | 640 | 30 | P | 590 | 30 | P | 610 | 10 | P | 710 | 160 | E/P |
| C4 | a | 260 | 10 | P | 230 | 10 | P | 230 | 10 | P | 230 | 10 | P |
| C5 | f* | 740 | 160 | P/LS | 370 | 10 | P | 310 | 60 | ** | 130 | 10 | ** |

*540° F. exit extruder and die.
** PE from tie

Examples 6 to 9

Effect of Extrusion Temperature

The laminate A/B/C was prepared using resin b for layer B, air gap of 8 inches, line speed of 500 feet/minute, chill roll temperature of 50° F., lead-in of −0.5 inches, and nip pressure of 60 psig. The nip to chill roll contact across the 740 mm width was from about 13 to about 15 mm. The thickness of layer B was from about 0.6 to about 0.8 mils. The extrusion temperature was varied from about 545 to about 618° F.

TABLE 4

| | | Peel Strength to Foil, g/in | | | | | | | | | | |
|---|---|---|---|---|---|---|---|---|---|---|---|---|
| | Extrusion | Green | | | 1 week | | | 4 weeks | | | 6 weeks | | |
| Ex. | Temp (° F.) | Mean | Std | Mode | Mean | Std | Mode | Mean | Std | Mode | Mean | Std | Mode |
| 6 | 545 | 500 | 30 | P | 230 | 30 | P | 240 | 30 | P | 300 | 30 | P |
| 7 | 578 | 810 | 60 | P | 810 | 80 | P | 930 | 200 | P | 940 | 200 | P |
| 8 | 597 | 860 | 20 | P | 1090 | 180 | P, E/P | 1360 | 120 | P | 1360 | 140 | E/P |
| 9 | 618 | 840 | 60 | P | 930 | 80 | P | 1420 | 100 | E/P | 1130 | 140 | P, E/P |

Inspection of the peel strength in Tables 1-4 shows that use of ethylene/methyl acrylate copolymers as adhesive layers in lamination of foil to polyolefins provided significantly better adhesion and that this adhesion was maintained over time.

Example 10

In Example 10, a multilayer structure comprising a laminate of oriented polyester (OPET) and aluminum foil was prepared by extrusion coating using an ethylene-methyl acrylate copolymer as an adhesive layer: 13-microns thick OPET/ ethylene-methyl acrylate copolymer/50-microns thick aluminum foil. The OPET was Mylar® 48LB supplied by DuPont Teijin Films. The aluminum foil had Class A wettability (i.e. water wets the surface). The laminate was prepared by extruding the EMA copolymer resin b (from Table 1) using a 4.5-inch diameter, 126-inch long, single screw extruder (with an exit temperature of 610° F.) through an ER-WE-PA feedblock with a 40-inch wide (internally deckled to 29 inches) Cloeren edge bead reduction die having a 30-mil gap operated at 615° F. and backpressure of 500 psig to form a layer laid down between the foil and OPET layers. The die plug and blade settings were 2.25 and 1.5 inches, respectively, and the other operating parameters include an air gap of 8 inches, line speed of 500 feet/minute, chill roll temperature of 50° F., lead-in of −0.6 inches, and nip pressure of 60 psig. The nip to chill roll contact across the 740 mm width was from about 13 to about 15 mm. The thickness of the EMA adhesive layer was from about 0.6 to about 0.8 mils. The chill roll contacted the foil side of the assembly.

Example 11

This example was prepared according to methods described for Example 10, except that the foil was 9 microns thick.

Example 12

In Example 12, a multilayer structure comprising a laminate of polyethylene (Substrate C) and the multilayer OPET/ EMA/foil structure of Example 11 was prepared by extrusion coating using an ethylene/methyl acrylate copolymer as an adhesive layer. The laminate was prepared by extruding the EMA copolymer resin b (from Table 1) using a 4.5-inch diameter, 126-inch long, single screw extruder (with an exit temperature of 610° F.) through an ER-WE-PA feedblock with a 40-inch wide (internally deckled to 29 inches) Cloeren edge bead reduction die having a 30-mil gap operated at 615° F. and backpressure 500 psig to form a layer laid down between the foil layer of Example 11 and the PE Substrate C.

The die plug and blade settings were 2.25 and 1.5 inches, respectively, and the other operating parameters included an air gap of 8 inches, line speed of 500 feet/minute, chill roll temperature of 50° F., lead-in of −0.6 inches, and nip pressure of 60 psig. The nip to chill roll contact across the 740 mm was from about 13 to about 15 mm. The thickness of the EMA adhesive layer was from about 0.6 to about 0.8 mils. The chill roll contacted the PE (Substrate C) side of the assembly.

Examples 13-15

In Examples 13-15, a multilayer structure comprising a laminate of oriented polyester (OPET) and aluminum foil was prepared by extrusion coating using an ethylene-methyl acrylate copolymer as an adhesive layer: 23-microns thick OPET/ethylene-methyl acrylate copolymer/50-microns thick aluminum foil. The OPET is Mylar® 92LB supplied by DuPont Teijin Films. It was supplied with both sides untreated. The OPET film was corona treated in-line at a setting of 3.5 kW. The aluminum foil had Class A wettability (i.e. water wetted the surface). The laminate was prepared by extruding the EMA copolymer resin b (from Table 1) using a 4.5-inch diameter, 126-inch long, single screw extruder (with an exit temperature of 625° F.) through an ER-WE-PA feedblock with a 40-inch wide (internally deckled to 29 inches) Cloeren edge bead reduction die having a 30-mil gap operated at 615° F. and backpressure of 500 psig to form a layer laid down between the foil and OPET layers. The die plug and blade settings were 2.25 and 1.5 inches, respectively, and the other operating parameters include an air gap of 8 inches, line speed of 500 feet/minute, chill roll temperature of 50° F., lead-in of −0.6 inches, and nip pressure of 60 psig. The nip to chill roll contact across the 740 mm width was from about 13 to about 15 mm. The thickness of the EMA adhesive layer was varied from about 0.5 to 1 mils. The chill roll contacted the foil side of the assembly.

Table 5 shows the results of Examples 13-15.

TABLE 5

| Example | EMA Thickness (mils) | Peel Strength to Foil, g/in | | | | | |
|---|---|---|---|---|---|---|---|
| | | Green | | | 1 week | | |
| | | Mean | Std | Mode | Mean | Std | Mode |
| 13 | 0.4–0.5 | 390 | 20 | P | 460 | 10 | P |
| 14 | 0.7–0.8 | 580 | 40 | P | 660 | 20 | P |
| 15 | 1.0–1.1 | 770 | 50 | P | 820 | 50 | P |

The OPET layer could not be separated from the EMA layer to measure peel strength.

The invention claimed is:

1. A multilayer structure comprising or produced from a first layer, a second layer, a third layer, and optionally a fourth layer wherein the first layer comprises foil; the second layer is an ethylene/methyl acrylate copolymer; the third layer comprises polyolefin or polyester; the optional fourth layer comprises or is produced from paper, polyester, polyamide, polyethylene vinyl alcohol, polyethylene vinyl acetate, ethylene/acrylic acid copolymer or ionomer thereof, polyvinylidene chloride, anhydride-modified ethylene homopolymer, anhydride-modified ethylene copolymer, or combinations of two or more thereof; and the second layer is in contact with the first layer.

2. The multilayer structure of claim 1 wherein the ethylene/methyl acrylate copolymer is prepared in a tubular reactor.

3. The multilayer structure of claim 2 further comprising the fourth layer.

4. A package comprising or produced from a multilayer structure wherein the multilayer structure is as recited in claim 1.

5. The package of claim 4 wherein the multilayer structure is as recited in claim 2.

6. The package of claim 4 wherein the multilayer structure is as recited in claim 3.

7. The package of claim 5 being a pouch.

8. The package of claim 6 being a pouch.

* * * * *